US012719084B2

(12) United States Patent
Jung et al.

(10) Patent No.: US 12,719,084 B2
(45) Date of Patent: Aug. 25, 2026

(54) ELECTROLYTE SOLUTION FOR LITHIUM-SULFUR BATTERY AND LITHIUM-SULFUR BATTERY COMPRISING SAME

(71) Applicant: LG ENERGY SOLUTION, LTD., Seoul (KR)

(72) Inventors: Unho Jung, Daejeon (KR); Eunji Jang, Daejeon (KR); Jaegil Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 594 days.

(21) Appl. No.: 18/027,297

(22) PCT Filed: Jun. 2, 2022

(86) PCT No.: PCT/KR2022/007802
§ 371 (c)(1),
(2) Date: Mar. 20, 2023

(87) PCT Pub. No.: WO2022/255803
PCT Pub. Date: Dec. 8, 2022

(65) Prior Publication Data

US 2023/0378533 A1 Nov. 23, 2023

(30) Foreign Application Priority Data

Jun. 3, 2021 (KR) ........................ 10-2021-0071883

(51) Int. Cl.
*H01M 10/0567* (2010.01)
*H01M 10/052* (2010.01)
*H01M 10/0569* (2010.01)
*H01M 50/46* (2021.01)

(52) U.S. Cl.
CPC ..... *H01M 10/0567* (2013.01); *H01M 10/052* (2013.01); *H01M 10/0569* (2013.01); *H01M 50/46* (2021.01); *H01M 2300/0025* (2013.01)

(58) Field of Classification Search
CPC ........... H01M 10/0567; H01M 10/052; H01M 10/0525
See application file for complete search history.

(56) References Cited

U.S. PATENT DOCUMENTS

| | | | | |
|---|---|---|---|---|
| 2005/0095508 | A1 | 5/2005 | Yamamoto | |
| 2005/0175904 | A1 | 8/2005 | Gorkovenko | |
| 2008/0081261 | A1 | 4/2008 | Takahashi | |
| 2016/0036092 | A1 | 2/2016 | Ye et al. | |
| 2018/0342758 | A1 | 11/2018 | Tang et al. | |
| 2019/0036169 | A1 | 1/2019 | Wang et al. | |
| 2019/0088980 | A1 | 3/2019 | Park et al. | |
| 2019/0319322 | A1 | 10/2019 | Kwon et al. | |
| 2020/0014062 | A1 | 1/2020 | Kaga et al. | |
| 2020/0106132 | A1* | 4/2020 | Yang | H01M 10/0568 |
| 2020/0136112 | A1* | 4/2020 | Kim | H01M 4/38 |
| 2020/0350608 | A1 | 11/2020 | Ito et al. | |
| 2020/0350629 | A1 | 11/2020 | Fujimoto et al. | |
| 2021/0226254 | A1 | 7/2021 | Kim et al. | |
| 2021/0242502 | A1 | 8/2021 | Ha et al. | |

FOREIGN PATENT DOCUMENTS

| | | | |
|---|---|---|---|
| CN | 104022310 | A | 9/2014 |
| CN | 105336984 | A | 2/2016 |
| CN | 110854437 | A | 2/2020 |
| CN | 111740165 | A | 10/2020 |
| EP | 3131152 | A1 | 2/2017 |
| EP | 3370294 | A1 | 9/2018 |
| EP | 3806214 | A1 | 4/2021 |
| JP | S62-136766 | A | 6/1987 |
| JP | 2004-342575 | A | 12/2004 |
| JP | 2007-522638 | A | 8/2007 |
| JP | 2008-084705 | A | 4/2008 |
| JP | 6699877 | B2 | 5/2020 |
| KR | 10-1166275 | B1 | 7/2012 |
| KR | 10-2017-0084452 | A | 7/2017 |
| KR | 10-1771293 | B1 | 8/2017 |
| KR | 10-2018-0115591 | A | 10/2018 |
| KR | 10-2019-0119963 | A | 10/2019 |
| KR | 10-2019-0125740 | A | 11/2019 |
| KR | 10-2126252 | B1 | 6/2020 |
| KR | 10-2261432 | B1 | 6/2021 |
| WO | 2019/222346 | A1 | 11/2019 |

OTHER PUBLICATIONS

Xue Li, “Preparation and Modification of Negative Electrode Materials for Lithium-ion and Sodium-ion Batteries”, Beijing Metallurgical Industry Press, 4 pages, 2020 (English translation provided).
Fengchun Sun et al., “Handbook of Electric Vehicle Engineering”, vol. 4, Power Power Batteries, China Machine Press, 5 pages, 2019 (English translation provided).

* cited by examiner

*Primary Examiner* — Jeremiah R Smith
(74) *Attorney, Agent, or Firm* — Bryan Cave Leighton Paisner LLP

(57) ABSTRACT

The present disclosure relates to an electrolyte solution for a lithium-sulfur battery comprising a lithium salt, an organic solvent and an additive, wherein the additive comprises a compound represented by Formula 1, and therein R1 to R6 are the same as or different from each other, and are each independently selected from the group consisting of hydrogen; deuterium; a substituted or unsubstituted C1 to C60 alkyl group; a substituted or unsubstituted C6 to C60 aryl group; a substituted or unsubstituted C1 to C60 alkoxy group; and a substituted or unsubstituted C6 to C60 aryloxy group, and at least one of R1 to R6 is not H, and a lithium-sulfur battery containing the same.

2 Claims, No Drawings

ELECTROLYTE SOLUTION FOR LITHIUM-SULFUR BATTERY AND LITHIUM-SULFUR BATTERY COMPRISING SAME

CROSS-REFERENCE TO RELATED APPLICATIONS

This application is a National Phase entry pursuant to 35 U.S.C. § 371 of International Application No. PCT/KR2022/007802, filed on Jun. 2, 2022, and claims the benefit of and priority to Korean Patent Application No. 10-2021-0071883, filed on Jun. 3, 2021, the disclosures of which are incorporated by reference in their entirety for all purposes as if fully set forth herein.

TECHNICAL FIELD

The present disclosure relates to an electrolyte solution for a lithium-sulfur battery and a lithium-sulfur battery comprising the same.

BACKGROUND

As the scope of use of a secondary battery has been expanded from small portable electronic devices to medium and large-sized electric vehicles (EV), energy storage systems (ESS), and electric ships, the demand for a lithium secondary battery with high capacity, high energy density and long lifetime is rapidly increasing.

Since lithium metal theoretically has a very high specific capacity of 3,860 mAh/g, and has a low potential as the negative electrode material, and has a very small density, there have been a variety of attempts to use it as the negative electrode for the battery.

Among them, a lithium-sulfur secondary battery means a battery system using a sulfur-based material having a 'sulfur-sulfur bond (S—S bond)' as a positive electrode active material and using lithium metal as a negative electrode active material. There is a characteristic that Sulfur, which is the main material of the positive electrode active material, has a low atomic weight, is very rich in resources and thus easy to supply and receive, and also is cheap, thereby lowering the manufacturing cost of the battery, and is non-toxic and environmentally friendly.

In particular, since the lithium-sulfur secondary battery has a theoretical discharge capacity of 1,675 mAh/g-sulfur, and can theoretically realize a high energy storage density of 2,600 Wh/kg compared to its weight, it has a very high value compared to the theoretical energy density of other battery systems (Ni-MH battery: 450 Wh/kg, Li—FeS battery: 480 Wh/kg, Li—$MnO_2$ battery: 1,000 Wh/kg, Na—S battery: 800 Wh/kg) and a lithium-ion battery (250 Wh/kg) currently being studied, and thus is receiving great attention in the market of the medium and large-sized secondary batteries that are being developed so far.

Degeneration of the lithium negative electrode is a factor affecting the lifetime of the lithium-sulfur secondary battery, which may occur due to a reaction with a positive electrode active material or a reaction with an electrolyte solution. As a result, the degradation of the negative electrode has been pointed out as a problem of forming dendrites and lowering Coulombic Efficiency (C.E.). In particular, when the dendrite is formed in a one-dimensional shape, it passes through the separator with pores, thereby generating an internal short circuit and causing problems of stability and reduced lifetime due to combustion of the electrolyte solution.

Accordingly, in order to improve the problem of the lithium-sulfur battery due to the dendrite phenomenon, there is a need for research to suppress the formation of dendrites by uniformly depositing (plating) and peeling (stripping) lithium on the surface of the negative electrode.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

DISCLOSURE

Technical Problem

In order to solve the above problems, the inventors of the present disclosure intend to provide a lithium-sulfur battery with improved lifetime and efficiency by adding dioxolane-based derivatives to the electrolyte solution for the lithium-sulfur battery.

Technical Solution

According to a first aspect of the invention, the present disclosure provides an electrolyte solution for a lithium-sulfur battery comprising a lithium salt, an organic solvent and an additive, wherein the additive comprises a compound represented by Formula 1 below:

[Formula 1]

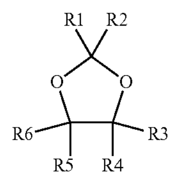

wherein R1 to R6 are the same as or different from each other, and are each independently selected from the group consisting of hydrogen; deuterium; a substituted or unsubstituted C1 to C60 alkyl group; a substituted or unsubstituted C6 to C60 aryl group; a substituted or unsubstituted C1 to C60 alkoxy group; and a substituted or unsubstituted C6 to C60 aryloxy group, and at least one of R1 to R6 is not H.

In one embodiment of the present disclosure, R1 to R6 above are the same as or different from each other, and are each independently selected from the group consisting of hydrogen; deuterium; a substituted or unsubstituted C1 to C20 alkyl group; a substituted or unsubstituted C6 to C20 aryl group; a substituted or unsubstituted C1 to C20 alkoxy group; and a substituted or unsubstituted C6 to C20 aryloxy group, and at least one of R1 to R6 may not be H.

In one embodiment of the present disclosure, R1 to R6 are the same as or different from each other, and are each independently selected from the group consisting of hydrogen; deuterium; and a substituted or unsubstituted C1 to C10 alkyl group, and at least one of R1 to R6 may not be H.

In one embodiment of the present disclosure, R1 to R6 are the same as or different from each other, and are each independently selected from the group consisting of hydrogen; deuterium; a methyl group; an ethyl group; a propyl group; a n-propyl group; an isopropyl group; a butyl group; a n-butyl group; an isobutyl group; a tert-butyl group; a sec-butyl group; a 1-methyl-butyl group; a 1-ethyl-butyl group; a pentyl group; a n-pentyl group; an isopentyl group; a neopentyl group; a tert-pentyl group; a hexyl group; a n-hexyl group; a 1-methylpentyl group; a 2-methylpentyl group; a 4-methyl-2-pentyl group; a 3,3-dimethylbutyl group; and a 2-ethylbutyl group, and at least one of R1 to R6 may not be H.

In one embodiment of the present disclosure, the compound represented by Formula 1 may be selected from the group consisting of 2-methyl-1,3-dioxolane, 4-methyl-1,3-dioxolane, 2-ethyl-2-methyl-1,3-dioxolane, 2,2-dimethyl-1,3-dioxolane, 2,2,4-trimethyl-1,3-dioxolane and combinations thereof.

In one embodiment of the present disclosure, the electrolyte solution for the lithium-sulfur battery may comprise the compound represented by Formula 1 in an amount of 0.1 to 5% by weight relative to the total weight of the electrolyte solution.

In one embodiment of the present disclosure, the compound represented by Formula 1 is 2-methyl-1,3-dioxolane, and the electrolyte solution for the lithium-sulfur battery may comprise the compound represented by Formula 1 in an amount of 0.1 to 5% by weight based on the total weight of the electrolyte solution.

According to a second aspect of the invention, the present disclosure provides a lithium-sulfur battery comprising a positive electrode; a negative electrode; a separator interposed between the positive electrode and the negative electrode; and the electrolyte solution described above.

Advantageous Effects

The lithium-sulfur battery according to the present disclosure may have the effect of suppressing the generation of lithium dendrites and improving the lifetime and coulombic efficiency of the battery, by incorporating dioxolane-based derivatives as additives into the electrolyte solution and thus forming a protective film through ring opening polymerization on the surface of the negative electrode, which is a lithium-based metal.

DETAILED DESCRIPTION

The embodiments provided according to the present disclosure can all be achieved by the following description. It is to be understood that the following description is to be understood as describing preferred embodiments of the present disclosure and the present disclosure is not necessarily limited thereto.

The term "polysulfide" used in the present disclosure has a concept comprising both "polysulfide ion ($S_x^{2-}$, x=8, 6, 4, 2)" and "lithium polysulfide ($Li_2S_x$ or $LiS_x^-$, x=8, 6, 4, 2)".

The term "substituted" used herein means that hydrogen atoms bonded to the carbon atom of the compound are exchanged with another substituents, and the position to be substituted is not limited as long as the position is a position where a hydrogen atom is substituted, that is, a position where a substituent can be substituted, and if two or more substituents are substituted, two or more substituents may be the same or different from each other.

Any substituents of the term "substituted or unsubstituted" used herein may be one or more substituents selected from the group consisting of deuterium; halogen; a cyano group; an alkyl group having 1 to 60 carbon atoms; an alkenyl group having 2 to 60 carbon atoms; an alkynyl group having 2 to 60 carbon atoms; a cycloalkyl group having 3 to 60 carbon atoms; a heterocycloalkyl group having 2 to 60 carbon atoms; an aryl group having 5 to 60 carbon atoms; a heteroaryl group having 2 to 60 carbon atoms; an alkoxy group having 1 to 60 carbon atoms; an aryloxy group having 5 to 60 carbon atoms; an alkylsilyl group having 1 to 60 carbon atoms; and an arylsilyl group having 6 to 60 carbon atoms, and if the substituents are plural, they may be the same or different from each other.

Electrolyte Solution for Lithium-Sulfur Battery

The present disclosure provides an electrolyte solution for a lithium-sulfur battery comprising a lithium salt, an organic solvent and an additive, wherein the additive comprises a compound represented by Formula 1 below.

[Formula 1]

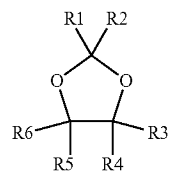

Wherein,

R1 to R6 are the same as or different from each other, and are each independently selected from the group consisting of hydrogen; deuterium; a substituted or unsubstituted C1 to C60 alkyl group; a substituted or unsubstituted C6 to C60 aryl group; a substituted or unsubstituted C1 to C60 alkoxy group; and a substituted or unsubstituted C6 to C60 aryloxy group, and at least one of R1 to R6 is not H.

By incorporating dioxolane derivatives, which is the compound represented by Formula 1 above, as an additive into the electrolyte solution for the lithium-sulfur battery and thus forming a protective film for the negative electrode through ring opening polymerization on the surface of the lithium-based metal used as the negative electrode, there is an effect of reducing the formation of dendrites and improving the lifetime and efficiency characteristics of the battery through efficient deposition (plating) and peeling (stripping) processes.

R1 to R6 are the same as or different from each other, and are each independently selected from the group consisting of hydrogen; deuterium; a substituted or unsubstituted C1 to C60 alkyl group; a substituted or unsubstituted C6 to C60 aryl group; a substituted or unsubstituted C1 to C60 alkoxy group; and a substituted or unsubstituted C6 to C60 aryloxy group, and at least one of R1 to R6 may not be H.

R1 to R6 are the same as or different from each other, and are each independently selected from the group consisting of hydrogen; deuterium; a substituted or unsubstituted C1 to C40 alkyl group; a substituted or unsubstituted C6 to C40 aryl group; a substituted or unsubstituted C1 to C40 alkoxy group; and a substituted or unsubstituted C6 to C40 aryloxy group, and at least one of R1 to R6 may not be H.

R1 to R6 are the same as or different from each other, and are each independently selected from the group consisting of hydrogen; deuterium; a substituted or unsubstituted C1 to C20 alkyl group; a substituted or unsubstituted C6 to C20 aryl group; a substituted or unsubstituted C1 to C20 alkoxy group; and a substituted or unsubstituted C6 to C20 aryloxy group, and at least one of R1 to R6 may not be H.

R1 to R6 are the same as or different from each other, and are each independently selected from the group consisting of hydrogen; deuterium; a substituted or unsubstituted C1 to C10 alkyl group; a substituted or unsubstituted C6 to C10 aryl group; a substituted or unsubstituted C1 to C10 alkoxy group; and a substituted or unsubstituted C6 to C10 aryloxy group, and at least one of R1 to R6 may not be H.

R1 to R6 are the same as or different from each other, and are each independently selected from the group consisting of hydrogen; deuterium; a substituted or unsubstituted C1 to C10 alkyl group; a substituted or unsubstituted C6 to C10 aryl group; and a substituted or unsubstituted C1 to C10 alkoxy group, and at least one of R1 to R6 may not be H.

R1 to R6 are the same as or different from each other, and are each independently selected from the group consisting of hydrogen; deuterium; a substituted or unsubstituted C1 to C10 alkyl group; a substituted or unsubstituted C6 to C10 aryl group; and a substituted or unsubstituted C6 to C10 aryloxy group, and at least one of R1 to R6 may not be H.

R1 to R6 in Formula 1 above are the same as or different from each other, and are each independently selected from the group consisting of hydrogen; deuterium; a substituted or unsubstituted C1 to C10 alkyl group; a substituted or unsubstituted C1 to C10 alkoxy group; and a substituted or unsubstituted C6 to C10 aryloxy group, and at least one of R1 to R6 may not be H.

R1 to R6 in Formula 1 above are the same as or different from each other, and are each independently selected from the group consisting of hydrogen; deuterium; a substituted or unsubstituted C6 to C10 aryl group; a substituted or unsubstituted C1 to C10 alkoxy group; and a substituted or unsubstituted C6 to C10 aryloxy group, and at least one of R1 to R6 may not be H.

R1 to R6 in Formula 1 above are the same as or different from each other, and are each independently selected from the group consisting of hydrogen; deuterium; a substituted or unsubstituted C1 to C10 alkyl group; and a substituted or unsubstituted C6 to C10 aryl group, and at least one of R1 to R6 may not be H.

R1 to R6 are the same as or different from each other, and are each independently selected from the group consisting of hydrogen; deuterium; a substituted or unsubstituted C1 to C10 alkyl group, and at least one of R1 to R6 may not be H.

R1 to R6 are the same as or different from each other, and are each independently selected from the group consisting of hydrogen; deuterium; a methyl group; an ethyl group; a propyl group; a n-propyl group; an isopropyl group; a butyl group; a n-butyl group; an isobutyl group; a tert-butyl group; a sec-butyl group; a 1-methyl-butyl group; a 1-ethyl-butyl group; a pentyl group; a n-pentyl group; a isopentyl group; a neopentyl group; a tert-pentyl group; a hexyl group; a n-hexyl group; a 1-methylpentyl group; a 2-methylpentyl group; a 4-methyl-2-pentyl group; a 3,3-dimethylbutyl group; a 2-ethylbutyl group; a heptyl group; a n-heptyl group; a 1-methylhexyl group; a cyclopentylmethyl group; a cyclohexylmethyl group; an octyl group; a n-octyl group; a tert-octyl group; a 1-methylheptyl group; a 2-ethylhexyl group; a 2-propylpentyl group; a n-nonyl group; a 2,2-dimethylheptyl group; a 1-ethyl-propyl group; a 1,1-dimethyl-propyl group; an isohexyl group; a 2-methylpentyl group; a 4-methylhexyl group; and a 5-methylhexyl group, and at least one of R1 to R6 may not be H.

R1 to R6 are the same as or different from each other, and are each independently selected from the group consisting of hydrogen; deuterium; a methyl group; an ethyl group; a propyl group; a n-propyl group; an isopropyl group; a butyl group; a n-butyl group; an isobutyl group; a tert-butyl group; a sec-butyl group; a 1-methyl-butyl group; a 1-ethyl-butyl group; a pentyl group; a n-pentyl group; an isopentyl group; a neopentyl group; a tert-pentyl group; a hexyl group; a n-hexyl group; a 1-methylpentyl group; a 2-methylpentyl group; a 4-methyl-2-pentyl group; a 3,3-dimethylbutyl group; and a 2-ethylbutyl group, and at least one of R1 to R6 may not be H.

R1 to R6 are the same as or different from each other, and are each independently selected from the group consisting of hydrogen; deuterium; a methyl group; an ethyl group; a propyl group; a n-propyl group; an isopropyl group; a butyl group; a n-butyl group; an isobutyl group; a tert-butyl group; and a sec-butyl group, and at least one of R1 to R6 may not be H.

In the present specification, the alkyl group may be specifically selected from the group consisting of a methyl group; an ethyl group; a propyl group; a n-propyl group; an isopropyl group; a butyl group; a n-butyl group; an isobutyl group; a tert-butyl group; a sec-butyl group; a 1-methyl-butyl group; a 1-ethyl-butyl group; a pentyl group; a n-pentyl group; an isopentyl group; a neopentyl group; a tert-pentyl group; a hexyl group; a n-hexyl group; a 1-methylpentyl group; a 2-methylpentyl group; a 4-methyl-2-pentyl group; a 3,3-dimethylbutyl group; and a 2-ethylbutyl group; a heptyl group; a n-heptyl group; a 1-methylhexyl group; a cyclopentylmethyl group; a cyclohexylmethyl group; an octyl group; a n-octyl group; a tert-octyl group; a 1-methylheptyl group; a 2-ethylhexyl group; a 2-propylpentyl group; a n-nonyl group; a 2,2-dimethylheptyl group; a 1-ethyl-propyl group; a 1,1-dimethyl-propyl group; an isohexyl group; a 2-methylpentyl group; a 4-methylhexyl group; and a 5-methylhexyl group, but is not limited thereto.

In the present specification, the aryl group may be specifically selected from the group consisting of a phenyl group; a biphenyl group; a terphenyl group; a quarterphenyl group; a naphthyl group; an anthracenyl group; a phenanthrenyl group; a pyrenyl group; a perylenyl group; a triphenyl group; a chrysenyl group; a fluorenyl group; and a triphenylenyl group, but is not limited thereto.

In the present specification, the alkoxy group may be specifically selected from the group consisting of methoxy; ethoxy; n-propoxy; i-propyloxy; n-butoxy; isobutoxy; tert-butoxy; sec-butoxy; n-pentyloxy; neopentyloxy; isopentyloxy; n-hexyloxy; 3,3-dimethylbutyloxy; 2-ethylbutyloxy; n-octyloxy; n-nonyloxy; and n-decyloxy, but is not limited thereto.

In the present specification, the aryloxy group may be specifically selected from the group consisting of a phenoxy group; a p-tolyloxy group; a m-tolyloxy group; a 3,5-dimethyl-phenoxy group; a 2,4,6-trimethylphenoxy group; a p-tert-butylphenoxy group; a 3-biphenyloxy group; a 4-biphenyloxy group; a 1-naphthyloxy group; a 2-naphthyloxy group; a 4-methyl-1-naphthyloxy group; a 5-methyl-2-naphthyloxy group; a 1-anthryloxy group; a 2-anthryloxy group; a 9-anthryloxy group; a 1-phenanthryloxy group; a 3-phenanthryloxy group and a 9-phenanthryloxy group, but is not limited thereto.

The compound represented by Formula 1 may be selected from the group consisting of 2-methyl-1,3-dioxolane, 4-methyl-1,3-dioxolane, 2-ethyl-2-methyl-1,3-dioxolane, 2,2-dimethyl-1,3-dioxolane, 2,2,4-trimethyl-1,3-dioxolane and combinations thereof, and preferably selected from the group consisting of 2-methyl-1,3-dioxolane, 4-methyl-1,3-dioxolane, 2-ethyl-2-methyl-1,3-dioxolane and combinations thereof.

The electrolyte solution for the lithium-sulfur battery may contain the compound represented by Formula 1 in the amount of 0.1% by weight or more, 0.3% by weight or more, 0.5% by weight or more, 0.7% by weight or more, or 0.9% by weight or more relative to the total weight of the electrolyte solution, and may contain the compound represented by Formula 1 in the amount of 5% by weight or less, 4.6% by weight or less, 4.2% by weight or less, 3.8% by weight or less, 3.4% by weight or less, or 3% by weight or less. If the electrolyte solution for the lithium-sulfur battery contains less than 0.1% by weight of the compound represented by Formula 1 relative to the total weight of the electrolyte solution, there may be a problem that since the amount added is small, the formation of a protective film for the negative electrode is insignificant, and thus the intended function according to the addition of the additive of dioxolane-based derivatives cannot be exhibited. In addition, if the electrolyte solution for the lithium-sulfur battery contains the compound represented by Formula 1 in excess of 5% by weight relative to the total weight of the electrolyte solution, an overvoltage is induced in the battery, and thus there may be a problem with the operation of the battery.

In the electrolyte solution for the lithium-sulfur battery, the compound represented by Formula 1 is 2-methyl-1,3-dioxolane, and the electrolyte solution for the lithium-sulfur battery may contain 0.1 to 5% by weight of the compound represented by Formula 1 based on the total weight of the electrolyte solution.

The organic solvent may be selected from the group consisting of linear ether compounds, cyclic ether compounds, and combinations thereof.

The linear ether compound may be selected from the group consisting of dimethyl ether, diethyl ether, dipropyl ether, dibutyl ether, diisobutyl ether, ethyl methyl ether, ethyl propyl ether, ethyl tert-butyl ether, dimethoxymethane, trimethoxymethane, dimethoxyethane, diethoxyethane, dimethoxypropane, diethylene glycol dimethyl ether, diethylene glycol diethyl ether, triethylene glycol dimethyl ether, tetra-ethylene glycol dimethyl ether, ethylene glycol divinyl ether, diethylene glycol divinyl ether, triethylene glycol divinyl ether, dipropylene glycol dimethylene ether, butylene glycol ether, diethylene glycol ethyl methyl ether, diethylene glycol isopropyl methyl ether, diethylene glycol butyl methyl ether, diethylene glycol tert-butyl ethyl ether, ethylene glycol ethyl methyl ether, and combinations thereof.

The cyclic ether compound may be selected from the group consisting of 1,3-dioxolane, 4,5-dimethyl-dioxolane, 4,5-diethyl-dioxolane, 4-methyl-1,3-dioxolane, 4-ethyl-1,3-dioxolane, tetrahydrofuran, 2-methyltetrahydrofuran, 2,5-dimethyltetrahydrofuran, 2,5-dimethoxytetrahydrofuran, 2-ethoxytetrahydrofuran, 2-methyl-1,3-dioxolane, 2-vinyl-1,3-dioxolane, 2,2-dimethyl-1,3-dioxolane, 2-methoxy-1,3-dioxolane, 2-ethyl-2-methyl-1,3-dioxolane, tetrahydropyran, 1,4-dioxane, 1,2-dimethoxy benzene, 1,3-dimethoxy benzene, 1,4-dimethoxy benzene, isosorbide dimethyl ether, and combinations thereof.

The electrolyte solution for the lithium-sulfur battery of the present disclosure may contain a lithium salt. The lithium salt is a substance which can be easily dissolved in an organic solvent, and may be selected from the group consisting of LiCl, LiBr, LiI, LiClO4, $LiBF_4$, $LiB_{10}Cl_{10}$, $LiB(Ph)_4$, $LiC_4BO_8$, $LiPF_6$, $LiCF_3SO_3$, $LiCF_3CO_2$, $LiAsF_6$, $LiSbF_6$, $LiAlCl_4$, $LiSO_3CH_3$, $LiSO_3CF_3$, LiSCN, $LiC(CF_3SO_2)_3$, $LiN(CF_3SO_2)_2$, $LiN(C_2F_5SO_2)_2$, $LiN(SO_2F)_2$, lithium chloroborane, lithium lower aliphatic carboxylate, lithium tetraphenyl borate, and lithium imide, and preferably may be $LiN(CF_3SO_2)_2$ (LITFSI).

The concentration of the lithium salt may be 0.1 to 5.0 M, specifically 0.2 to 3.0 M, and more specifically 0.5 to 2.5 M depending on various factors such as the exact composition of the mixture contained in the electrolyte solution, the solubility of the salt, the conductivity of the dissolved salt, the charging and discharging conditions of the battery, the operating temperature, and other factors known in the lithium battery field. If the concentration of the lithium salt is less than 0.1 M, the conductivity of the electrolyte solution may be lowered and thus the performance of the electrolyte solution may be deteriorated. If the concentration of the lithium salt exceeds 5.0 M, the viscosity of the electrolyte solution may increase and thus the mobility of the lithium ion (Lit) may be reduced.

The electrolyte solution for the lithium-sulfur battery of the present disclosure may further comprise additives commonly used in the art in addition to the above-described components. For example, the additive may be selected from the group consisting of lithium nitrate ($LiNO_3$), potassium nitrate ($KNO_3$), cesium nitrate ($CsNO_3$), magnesium nitrate ($Mg(NO_3)_2$), barium nitrate ($Ba(NO_3)_2$), lithium nitrite ($LiNO_2$), potassium nitrite ($KNO_2$), cesium nitrite ($CsNO_2$) and combinations thereof.

The method for preparing the electrolyte solution for the lithium-sulfur battery according to the present disclosure is not particularly limited in the present disclosure, and may be prepared by a conventional method known in the art.

Lithium-Sulfur Battery

The lithium-sulfur battery according to the present disclosure comprises a positive electrode; a negative electrode; a separator interposed between the positive electrode and the negative electrode; and an electrolyte solution, wherein the electrolyte solution comprises the electrolyte solution for the lithium-sulfur battery according to the present disclosure.

The positive electrode may comprise a positive electrode current collector and a positive electrode active material layer coated on one surface or both surfaces of the positive electrode current collector.

The positive electrode current collector supports the positive electrode active material and is not particularly limited as long as it has high conductivity without causing chemical changes in the battery. For example, copper, stainless steel, aluminum, nickel, titanium, palladium, sintered carbon; copper or stainless steel surface-treated with carbon, nickel, silver or the like; aluminum-cadmium alloy or the like may be used as the positive electrode current collector.

The positive electrode current collector can enhance the bonding strength with the positive electrode active material by having fine irregularities on its surface, and may be formed in various forms such as film, sheet, foil, mesh, net, porous body, foam, or nonwoven fabric.

The positive electrode active material layer may include a positive electrode active material, a binder, and an electrically conductive material.

The positive electrode active material may be at least one selected from the group consisting of elemental sulfur ($S_8$), an organic sulfur compound, $Li_2S_n$ ($n \geq 1$) and a carbon-sulfur polymer ($(C_2S_x)_n$, wherein $2.5 \leq x \leq 50$, $n \geq 2$). Preferably, the positive electrode active material may be inorganic sulfur ($S_8$).

Sulfur contained in the positive electrode active material is used in combination with a conductive material such as a carbon material because it does not have electrical conductivity alone. Accordingly, sulfur is comprised in the form of a sulfur-carbon composite, and preferably, the positive electrode active material may be a sulfur-carbon composite.

The carbon contained in the sulfur-carbon composite, which is a porous carbon material, provides a framework capable of uniformly and stably immobilizing the sulfur, and compensates for the low electrical conductivity of sulfur so that the electrochemical reaction can be proceeded smoothly.

The porous carbon material can be generally produced by carbonizing precursors of various carbon materials. The porous carbon material may comprise uneven pores therein, the average diameter of the pores is in the range of 1 to 200 nm, and the porosity may be in the range of 10 to 90% of the total volume of the porous carbon material. If the average diameter of the pores is less than the above ranges, the pore size is only at the molecular level, and thus impregnation with sulfur is impossible. On the contrary, if the average diameter of the pores exceeds the above ranges, the mechanical strength of the porous carbon material is weakened, which is not preferable for application to the manufacturing process of the electrode.

The shape of the porous carbon material is in the form of sphere, rod, needle, plate, tube, or bulk, and can be used without limitation as long as it is commonly used in a lithium-sulfur battery.

The porous carbon material may have a porous structure or a high specific surface area, and may be any of those conventionally used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT) and multiwall carbon nanotubes (MWCNT); carbon fibers such as graphite nanofiber (GNF), carbon nanofiber (CNF), and activated carbon fiber (ACF); graphite such as natural graphite, artificial graphite, expanded graphite; and activated carbon.

The method for preparing the sulfur-carbon composite is not particularly limited in the present disclosure, and a method commonly used in the art may be used.

The positive electrode may further comprise one or more additives, in addition to the positive electrode active material, selected from transition metal elements, group IIIA elements, group IVA elements, sulfur compounds of these elements, and alloys of these elements with sulfur.

The transition metal element may comprise Sc, Ti, V, Cr, Mn, Fe, Co, Ni, Cu, Zn, Y, Zr, Nb, Mo, Tc, Ru, Rh, Pd, Os, Ir, Pt, Au, Hg and the like, and the group IIIA element may comprise Al, Ga, In, Ti and the like, and the group IVA element may comprise Ge, Sn, Pb, and the like.

The electrically conductive material is a material that acts as a path, through which electrons are transferred from the current collector to the positive electrode active material, by electrically connecting the current collector and the positive electrode active material. The electrically conductive material can be used without limitation as long as it has electrical conductivity.

For example, as the electrically conductive material, graphite such as natural graphite or artificial graphite; carbon blacks such as Super-P, Denka black, acetylene black, Ketjen black, channel black, furnace black, lamp black, and thermal black; carbon derivatives such as carbon nanotubes and fullerenes; electrically conductive fibers such as carbon fibers and metal fibers; carbon fluoride; metal powders such as aluminum and nickel powder; or electrically conductive polymers such as polyaniline, polythiophene, polyacetylene, and polypyrrole may be used alone or in combination.

The binder maintains the positive electrode active material in the positive electrode current collector, and organically connects between the positive electrode active materials to increase the bonding force between them, and any binder known in the art may be used.

For example, the binder may be any one selected from fluororesin-based binders comprising polyvinylidene fluoride (PVdF) or polytetrafluoroethylene (PTFE); rubber-based binders comprising styrene butadiene rubber (SBR), acrylonitrile-butadiene rubber, and styrene-isoprene rubber; cellulose-based binders comprising carboxymethylcellulose (CMC), starch, hydroxy propyl cellulose, and regenerated cellulose; polyalcohol-based binders comprising polyvinyl alcohol (PVA); polyacrylic binder comprising polyacrylic acid (PAA); polyolefin-based binders comprising polyethylene and polypropylene; polyimide-based binders; polyester-based binders; and silane-based binders, or mixtures or copolymers of two or more thereof.

The method of manufacturing the positive electrode is not particularly limited in the present disclosure, and a method commonly used in the art may be used. As an example, the positive electrode may be manufactured by preparing a slurry composition for a positive electrode, and then applying the slurry composition to at least one surface of the positive electrode current collector.

The slurry composition for a positive electrode comprises the positive electrode active material, the electrically conductive material, and the binder as described above, and may further comprise a solvent other than the above.

As the solvent, one capable of uniformly dispersing a positive electrode active material, an electrically conductive material, and a binder is used. Such a solvent is an aqueous solvent, and water is most preferred, and in this case, water may be distilled water or de-ionized water. However, it is not necessarily limited thereto, and if necessary, a lower alcohol that can be easily mixed with water may be used. Examples of the lower alcohol comprise methanol, ethanol, propanol, isopropanol, and butanol, and preferably, they may be used in combination with water.

The loading amount of sulfur in the positive electrode may be 1 to 10 $mAh/cm^2$, and preferably 1 to 6 $mAh/cm^2$.

The negative electrode may comprise a negative electrode current collector and a negative electrode active material layer coated on one surface or both surfaces of the negative electrode current collector. Alternatively, the negative electrode may be a lithium metal plate.

The negative electrode current collector is for supporting the negative electrode active material layer, and is not particularly limited as long as it has high conductivity without causing chemical changes in the battery, and may be selected from the group consisting of copper, aluminum, stainless steel, zinc, titanium, silver, palladium, nickel, iron, chromium, and alloys and combinations thereof. The stainless steel can be surface-treated with carbon, nickel, titanium, or silver, and the alloy may be an aluminum-cadmium alloy. In addition to those, sintered carbon, a non-conductive polymer surface-treated with an electrically conductive material, or an electrically conductive polymer may be used. Generally, a thin copper plate is used as the negative electrode current collector.

In addition, the shape of the negative electrode current collector can be various forms such as a film having or not having fine irregularities on a surface, sheet, foil, net, porous body, foam, nonwoven fabric and the like.

The negative electrode active material layer may comprise an electrically conductive material, a binder, etc. in addition to the negative electrode active material. At this time, the electrically conductive material and the binder are as described above.

The negative electrode active material may comprise a material capable of reversibly intercalating or de-intercalating lithium ion ($Li^+$), a material capable of reacting with lithium ion to reversibly form lithium containing compounds, lithium metal, or lithium alloy.

The material capable of reversibly intercalating or de-intercalating lithium ion ($Li^+$) can be, for example, crystalline carbon, amorphous carbon, or a mixture thereof. The material capable of reacting with lithium ion ($Li^+$) to reversibly form lithium containing compounds may be, for example, tin oxide, titanium nitrate, or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

Preferably, the negative electrode active material may be lithium metal, and specifically, may be in the form of a lithium metal thin film or a lithium metal powder.

The method of forming the negative electrode active material is not particularly limited, and a method of forming a layer or film commonly used in the art may be used. For example, methods such as compression, coating, and deposition may be used. In addition, a case, in which a thin film of metallic lithium is formed on a metal plate by initial charging after assembling a battery without a lithium thin film in the current collector, is also comprised in the negative electrode of the present disclosure.

The electrolyte solution is for causing an electrochemical oxidation or reduction reaction in the positive electrode and the negative electrode through it, and is as described above.

The injection of the electrolyte solution may be performed at an appropriate step in the manufacturing process of a lithium-sulfur battery depending on the manufacturing process and required physical properties of the final product. That is, it can be applied before assembling the lithium-sulfur battery or in the final stage of assembling.

A conventional separator may be interposed between the positive electrode and the negative electrode. The separator is a physical separator having a function of physically separating the electrodes, and can be used without particular limitation as long as it is used as a conventional separator, and particularly, a separator with low resistance to ion migration in the electrolyte solution and excellent impregnating ability for the electrolyte solution is preferable.

In addition, the separator may be made of a porous, nonconductive, or insulating material which enables the transport of lithium ions between the positive electrode and the negative electrode while separating or insulating the positive electrode and the negative electrode from each other. The separator can be used without any particular limitation as long as it is normally used as a separator in a lithium-sulfur battery. The separator may be an independent member such as a film or a coating layer added to the positive electrode and/or the negative electrode.

The separator may be made of a porous substrate. Any of the porous substrates can be used as long as it is a porous substrate commonly used in a lithium-sulfur battery. A porous polymer film may be used alone or in the form of a laminate. For example, a non-woven fabric made of high melting point glass fibers, or polyethylene terephthalate fibers, etc. or a polyolefin-based porous membrane may be used, but is not limited thereto.

The material of the porous substrate is not particularly limited in the present disclosure, and any material can be used as long as it is a porous substrate commonly used in a lithium-sulfur battery. For example, the porous substrate may comprise at least one material selected from the group consisting of polyolefin such as polyethylene and polypropylene, polyester such as polyethyleneterephthalate and polybutyleneterephthalate, polyamide, polyacetal, polycarbonate, polyimide, polyetheretherketone, polyethersulfone, polyphenylene oxide, polyphenylenesulfide, polyethylenenaphthalate, polytetrafluoroethylene, polyvinylidene fluoride, polyvinyl chloride, polyacrylonitrile, cellulose, nylon, poly(p-phenylene benzobisoxazole), and polyarylate.

The thickness of the porous substrate is not particularly limited, but may be 1 to 100 μm, preferably 5 to 50 μm. Although the thickness range of the porous substrate is not particularly limited to the above-mentioned range, if the thickness is excessively thinner than the lower limit described above, mechanical properties are deteriorated and thus the separator may be easily damaged during use of the battery.

The average diameter and porosity of the pores present in the porous substrate are also not particularly limited, but may be 0.1 to 50 μm and 10 to 95%, respectively.

In the case of the lithium-sulfur battery according to the present disclosure, it is possible to perform laminating or stacking and folding processes of the separator and the electrode, in addition to the winding process which is a general process.

The shape of the lithium-sulfur battery is not particularly limited, and may have various shapes such as a cylindrical type, a stacked type, and a coin type.

Hereinafter, preferred examples of the present disclosure will be described in order to facilitate understanding of the present disclosure. However, the following examples are provided only for easier understanding of the present disclosure, and the present disclosure is not limited thereto.

Example: Manufacture of Lithium-Sulfur Battery

Preparation of Electrolyte Solution for Lithium-Sulfur Battery: Preparation Examples 1 to 24

Preparation Example 1

1,3-dioxolane and 1,2-dimethoxyethane as an organic solvent were mixed in a volume ratio (v/v) of 1:1, and 2-methyl-1,3-dioxolane of 0.5% by weight as an additive was added, and then 1M lithium bis(trifluoromethanesulfonyl)imide (LiTFSI) and $LiNO_3$ of 1% by weight were dissolved to prepare an electrolyte solution for a lithium-sulfur battery.

Preparation Examples 2 to 7

Electrolyte solutions for the lithium-sulfur battery were prepared in the same manner as in Preparation Example 1, except that the addition weight ratio of 2-methyl-1,3-dioxolane as an additive was changed as shown in Table 1 below.

Preparation Examples 8 to 14

Electrolyte solutions for the lithium-sulfur battery were prepared in the same manner as in Preparation Example 1, except that 4-methyl-1,3-dioxolane was used as an additive and its addition weight ratio was changed as shown in Table 1 below.

Preparation Examples 15 to 21

Electrolyte solutions for the lithium-sulfur battery were prepared in the same manner as in Preparation Example 1, except that 2-ethyl-2-methyl-1,3-dioxolane was used as an additive and its addition weight ratio was changed as shown in Table 1 below.

Preparation Example 22

An electrolyte solution for the lithium-sulfur battery were prepared in the same manner as in Preparation Example 1, except that the additive was not used.

Preparation Examples 23 and 24

An electrolyte solution for the lithium-sulfur battery were prepared in the same manner as in Preparation Example 1, except that 1,3-dioxolane was further added as an additive in a weight ratio as shown in Table 1 below.

TABLE 1

| | Additive type | Weight ratio (% by weight relative to total weight of electrolyte solution) |
|---|---|---|
| Preparation Example 1 | 2-methyl-1,3-dioxolane | 0.5 |
| Preparation Example 2 | 2-methyl-1,3-dioxolane | 1 |
| Preparation Example 3 | 2-methyl-1,3-dioxolane | 2 |
| Preparation Example 4 | 2-methyl-1,3-dioxolane | 3.5 |
| Preparation Example 5 | 2-methyl-1,3-dioxolane | 4.5 |
| Preparation Example 6 | 2-methyl-1,3-dioxolane | 5.5 |
| Preparation Example 7 | 2-methyl-1,3-dioxolane | 6.5 |
| Preparation Example 8 | 4-methyl-1,3-dioxolane | 0.5 |
| Preparation Example 9 | 4-methyl-1,3-dioxolane | 1 |
| Preparation Example 10 | 4-methyl-1,3-dioxolane | 2 |
| Preparation Example 11 | 4-methyl-1,3-dioxolane | 3.5 |
| Preparation Example 12 | 4-methyl-1,3-dioxolane | 4.5 |
| Preparation Example 13 | 4-methyl-1,3-dioxolane | 5.5 |
| Preparation Example 14 | 4-methyl-1,3-dioxolane | 6.5 |
| Preparation Example 15 | 2-ehtyl-2-methyl-1,3-dioxolane | 0.5 |
| Preparation Example 16 | 2-ehty1-2-methyl-1,3-dioxolane | 1 |
| Preparation Example 17 | 2-ehtyl-2-methyl-1,3-dioxolane | 2 |
| Preparation Example 18 | 2-ehtyl-2-methyl-1,3-dioxolane | 3.5 |
| Preparation Example 19 | 2-ehtyl-2-methyl-1,3-dioxolane | 4.5 |
| Preparation Example 20 | 2-ehtyl-2-methyl-1,3-dioxolane | 5.5 |
| Preparation Example 21 | 2-ehtyl-2-methyl-1,3-dioxolane | 6.5 |
| Preparation Example 22 | — | — |
| Preparation Example 23 | 1,3-dioxolane | 1 |
| Preparation Example 24 | 1,3-dioxolane | 5 |

Manufacture of Lithium-Sulfur Battery: Examples 1 to 21 and Comparative Examples 1 to 3

Example 1

Water was used as a solvent, and a sulfur-carbon composite as a positive electrode active material, an electrically conductive material, and a binder were mixed in a ratio of 87.5:5:7.5 to prepare a slurry of the positive electrode active material. At this time, the sulfur-carbon composite was prepared by mixing sulfur and carbon nanotubes (CNT) in a weight ratio of 75:25. In addition, Denka black was used as an electrically conductive material, and styrene-butadiene rubber/carboxymethyl cellulose (SBR:CMC=70:30, weight ratio) was used as a binder to prepare a slurry composition of the positive electrode active material.

The slurry of the positive electrode active material was applied to one surface of an aluminum current collector, dried at 100° C. and then rolled to prepare a positive electrode having a porosity of 68% and a loading amount of 5.6 $mAh/cm^2$.

Lithium metal having a thickness of 45 μm was used as the negative electrode.

The prepared positive electrode and the negative electrode were positioned to face each other, and then a polyethylene separator having a thickness of 16 μm and a porosity of 45% was interposed between the positive electrode and the negative electrode to manufacture an electrode assembly. Thereafter, the electrode assembly was placed inside the case, and then, the electrolyte solution for the lithium-sulfur battery of Preparation Example 1 was injected into the case to manufacture a lithium-sulfur battery.

Examples 2 to 21

Lithium-sulfur batteries were manufactured in the same manner as in Example 1, except that the electrolyte solutions of Preparation Examples 2 to 21 were used as an electrolyte solution for a lithium-sulfur battery.

Comparative Examples 1 to 3

Lithium-sulfur batteries were prepared in the same manner as in Example 1, except that the electrolyte solutions of Preparation Examples 22 to 24 were used as an electrolyte solution for a lithium-sulfur battery.

TABLE 2

| | Electrolyte solution used |
|---|---|
| Example 1 | Preparation Example 1 |
| Example 2 | Preparation Example 2 |
| Example 3 | Preparation Example 3 |
| Example 4 | Preparation Example 4 |
| Example 5 | Preparation Example 5 |
| Example 6 | Preparation Example 6 |
| Example 7 | Preparation Example 7 |
| Example 8 | Preparation Example 8 |
| Example 9 | Preparation Example 9 |
| Example 10 | Preparation Example 10 |
| Example 11 | Preparation Example 11 |
| Example 12 | Preparation Example 12 |
| Example 13 | Preparation Example 13 |
| Example 14 | Preparation Example 14 |
| Example 15 | Preparation Example 15 |
| Example 16 | Preparation Example 16 |
| Example 17 | Preparation Example 17 |
| Example 18 | Preparation Example 18 |
| Example 19 | Preparation Example 19 |
| Example 20 | Preparation Example 20 |
| Example 21 | Preparation Example 21 |
| Comparative Example 1 | Preparation Example 22 |
| Comparative Example 2 | Preparation Example 23 |
| Comparative Example 3 | Preparation Example 24 |

Experimental Example 1: Evaluation of Lifetime Characteristics of Battery

For the lithium-sulfur batteries prepared in Examples 1 to 21 and Comparative Examples 1 to 3, the lifetime characteristics of the batteries were evaluated through repeated charging/discharging cycles, and the results of the evaluation are shown in Table 3 below.

Specifically, for the lithium-sulfur batteries, discharging to 1.8V at 0.1C and charging to 2.5V at 0.1C in CC mode were repeated twice under the operating temperature condition of the battery of 25° C., and then charging and discharging at 0.2C were repeated once, and 0.3C charging/0.5C discharging was repeated up to 200 cycles to evaluate the lifetime characteristics of the batteries.

In the evaluation of the lifetime characteristics of the batteries, the ratio (%) of the discharging capacity in the corresponding cycle compared to the discharging capacity in the cycle starting 0.3C charging/0.5C discharging is defined as retention, and also in order to evaluate the lifetime, the number of cycles when retention (%) was 80% is shown in Table 3 below.

TABLE 3

| | Number of cycles to reach 80% retention |
|---|---|
| Example 1 | 104 |
| Example 2 | 133 |
| Example 3 | 134 |
| Example 4 | 122 |
| Example 5 | 105 |
| Example 6 | 77 |
| Example 7 | 61 |
| Example 8 | 79 |
| Example 9 | 80 |
| Example 10 | 82 |
| Example 11 | 75 |
| Example 12 | 54 |
| Example 13 | 45 |
| Example 14 | 42 |
| Example 15 | 81 |
| Example 16 | 69 |
| Example 17 | 62 |
| Example 18 | 58 |
| Example 19 | 57 |
| Example 20 | 45 |
| Example 21 | 42 |
| Comparative Example 1 | 44 |
| Comparative Example 2 | 47 |
| Comparative Example 3 | 45 |

Through the results of Table 3, it was confirmed that in the case of lithium-sulfur batteries of Examples 1 to 7 containing '2-methyl-1,3-dioxolane' among dioxolane-based derivatives as an additive for an electrolyte solution, the capacity retention rate is maintained high and thus the battery has excellent lifetime characteristics even when cycles are repeated, as compared to 'Comparative Example 1 which does not contain an additive for an electrolyte solution at all' or 'Comparative Examples 2 and 3 containing 1,3-dioxolane as an additive for an electrolyte solution'.

Specifically, it was found that in the case of Examples 1 to 7 containing '2-methyl-1,3-dioxolane', which is a dioxolane-based derivative, as an additive for an electrolyte solution, a cycle retention rate reaches 80% when at least 61 cycles are reached. However, in the case of Comparative Examples 1 to 3, it was confirmed that the 80% retention rate has already been reached before 47 cycles, so the capacity retention rate according to charging and discharging is significantly lowered.

In particular, it was confirmed that in the case of Examples 1 to 5 containing '2-methyl-1,3-dioxolane' as an additive for an electrolyte solution in an amount of 0.1 to 5% by weight relative to the total weight of the electrolyte solution, they show capacity retention rates of 80% or more even after 100 cycles or more of charging and discharging, and thus has excellent lifetime characteristics.

In addition, it was confirmed that in the case of Examples 8 to 12 or Examples 15 to 19 using '4-methyl-1,3-dioxolane' and '2-ethyl-2-methyl-1,3-dioxolane' as an additive for an electrolyte solution in an amount of 0.1 to 5% by weight relative to the total weight of the electrolyte solution, they have a high-capacity retention rate and thus have excellent lifetime characteristics, as compared to the case where the additive is added in excess of 5% by weight.

All simple modifications or changes of the present disclosure are within the scope of the present disclosure, and the specific protection scope of the present disclosure will be made clear by the appended claims.

The invention claimed is:

1. A lithium-sulfur battery, comprising:
a positive electrode;
a negative electrode;
a separator interposed between the positive electrode and the negative electrode; and
an electrolyte solution,
wherein the electrolyte solution comprises:
a lithium salt;
an organic solvent; and
an additive,
wherein the additive comprises a compound represented by Formula 1 below:

[Formula 1]

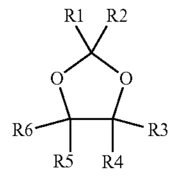

wherein R1 to R6 are the same as or different from each other, and are each independently selected from the group consisting of hydrogen; deuterium; a substituted or unsubstituted C1 to C60 alkyl group; a substituted or unsubstituted C6 to C60 aryl group; a substituted or unsubstituted C1 to C60 alkoxy group; and a substituted or unsubstituted C6 to C60 aryloxy group, and at least one of R1 to R6 is not H,
wherein the compound represented by Formula 1 is selected from the group consisting of 2-methyl-1,3-dioxolane, 4-methyl-1,3-dioxolane, 2-ethyl-2-methyl-1,3-dioxolane and a combination thereof, and
wherein the electrolyte solution contains 0.1 to 5% by weight of the compound represented by Formula 1 relative to a total weight of the electrolyte solution.

2. The lithium-sulfur battery according to claim 1, wherein the compound represented by Formula 1 is 2-methyl-1,3-dioxolane, and the electrolyte solution contains 0.1 to 5% by weight of the compound represented by Formula 1 relative to the total weight of the electrolyte solution.

* * * * *